United States Patent
Gustafsson et al.

[11] Patent Number: 6,058,880
[45] Date of Patent: May 9, 2000

[54] CLAW FOR A MILKING MACHINE

[75] Inventors: Marie-Louise Gustafsson, Stockholm; Torbjörn Petterson, Gnesta; Karl-Olof Sandgren, Grödinge, all of Sweden

[73] Assignee: Alfa Laval Agri AB, Tumba, Sweden

[21] Appl. No.: 09/117,762
[22] PCT Filed: Feb. 4, 1997
[86] PCT No.: PCT/SE97/00167
  § 371 Date: Aug. 4, 1998
  § 102(e) Date: Aug. 4, 1998
[87] PCT Pub. No.: WO97/27737
  PCT Pub. Date: Aug. 7, 1997

[30] Foreign Application Priority Data

Feb. 5, 1996 [SE] Sweden .................................. 9600413

[51] Int. Cl.[7] .................................................. A01K 5/00
[52] U.S. Cl. ........................................................ 119/14.54
[58] Field of Search ............................. 119/14.54, 14.55, 119/14.37

[56] References Cited

U.S. PATENT DOCUMENTS

| | | | |
|---|---|---|---|
| 1,776,909 | 9/1930 | Hull ........................................ | 119/14.55 |
| 2,429,983 | 11/1947 | Bender et al. . | |
| 2,507,969 | 5/1950 | Gascoigne ............................. | 119/14.55 |
| 2,513,627 | 7/1950 | Dinesen ................ | 119/14.16 |
| 2,775,225 | 12/1956 | Brown et al. . | |
| 2,896,574 | 7/1959 | Larsen .................................. | 119/14.54 |
| 3,029,787 | 4/1962 | Lamberson . | |
| 3,077,180 | 2/1963 | Hagg et al. ........................... | 119/14.01 |
| 3,094,099 | 6/1963 | Bertao . | |
| 3,150,637 | 9/1964 | Fosnes . | |
| 3,406,663 | 10/1968 | Duncan ................................. | 119/14.01 |
| 4,344,385 | 8/1982 | Swanson et al. ..................... | 119/14.08 |
| 4,807,566 | 2/1989 | Chowdhury ........................... | 119/14.55 |
| 4,907,535 | 3/1990 | Matsuzawa et al. ................. | 119/14.55 |
| 5,076,211 | 12/1991 | Tonelli . | |
| 5,664,521 | 9/1997 | Simpson et al. ...................... | 119/14.02 |

FOREIGN PATENT DOCUMENTS

| | | | |
|---|---|---|---|
| 418260 | 11/1989 | European Pat. Off. . | |
| 1158460 | 6/1958 | France . | |
| 1027457 | 4/1958 | Germany ............................. | 119/14.54 |
| 1097767 | 1/1961 | Germany . | |
| 404335840 | 11/1992 | Japan ................................... | 119/14.37 |
| 449154 | 4/1987 | Sweden . | |

Primary Examiner—Michael J. Carone
Assistant Examiner—James S. Bergin
Attorney, Agent, or Firm—Hovey, Williams Timmons & Collins

[57] ABSTRACT

A claw for a milking machine comprises a housing (1, 3) defining an inner space and having four inlet members (8', 9'), which are intended to connect the inner space of the housing (1, 3) to a respective teatcup of the milking machine, and an outlet member, adapted to connect the inner space of the housing (1, 3) to a milk collecting member of the milking machine via a conduit member. The four inlet members are provided in pairs in such a manner that they are adapted to the natural position of the teats. Thereby, a first pair (8), intended for two front teats of the animal to be milked, has a different position with respect to the center axis (5) than a second pair (9'), intended for the rear teats of the animal.

9 Claims, 6 Drawing Sheets

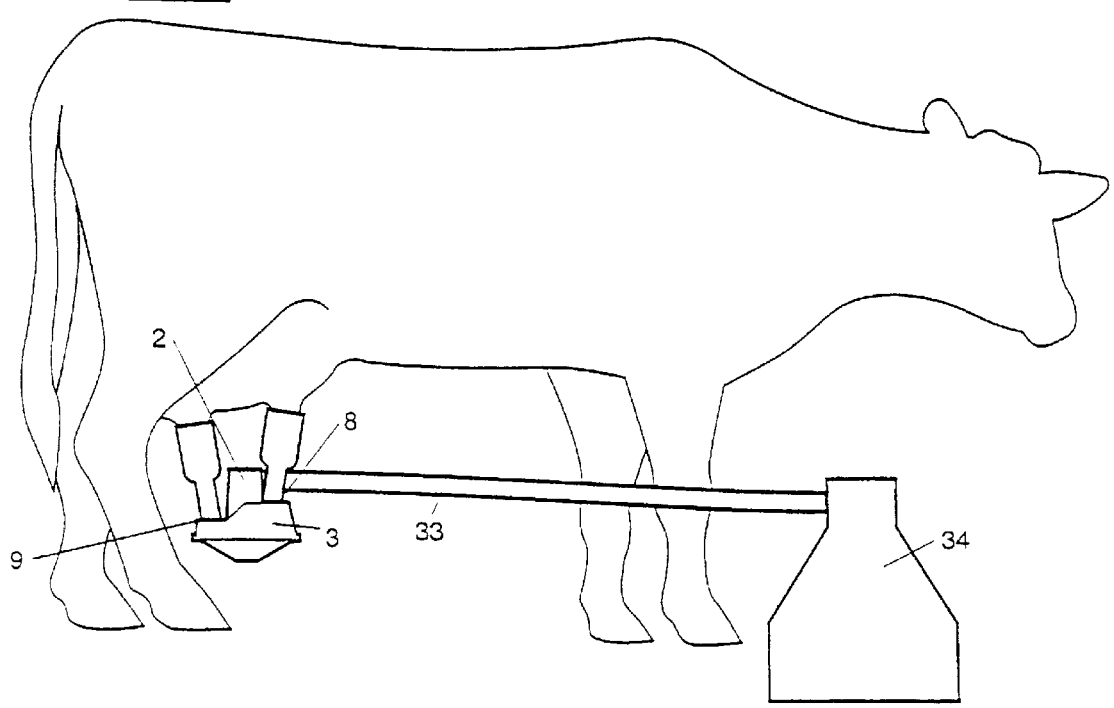
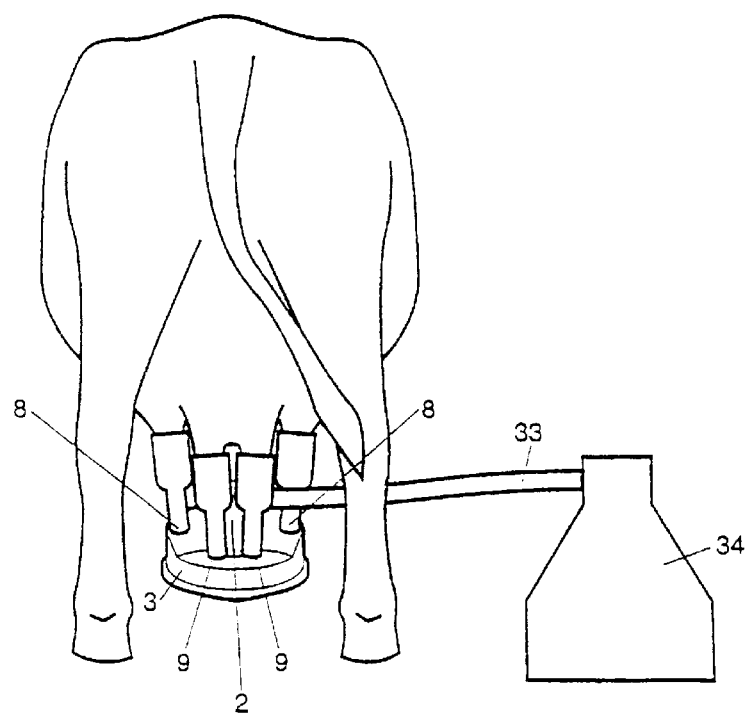

CLAW FOR A MILKING MACHINE

BACKGROUND OF THE INVENTION

1. Field of the Invention

The present invention refers to a claw for a milking machine, comprising a housing having four inlet members, which via four teatcup liners are adapted to connect the housing to four respective teats of an animal to be milked, and an outlet member, which via a conduit member is adapted to connect the housing to a milk collecting member of the milking machine, said housing having a center axis extending through the claw essentially vertically when the claw, in an operating position, is attached to the udder of the animal, said four inlet members being distributed around the centre axis and provided in pairs in such a manner that they are adapted to the natural position of the teats of the udder of the animal, a first pair of the inlet members, which is intended for two front teats of the animal, being directed obliquely forwardly and outwardly and having a different position with respect to the centre axis than a second pair of the inlet members, which is intended for the rear teats of the animal and is directed obliquely rearwardly and outwardly with respect to the centre axis.

2. Description of the Prior Art

Such a claw is known by EP-B-418 260 and comprises a housing, having a center axis which in an operating position of the claw extends vertically, an upper portion and a lower portion. The inner space of the housing forms a chamber for receiving milk via four inlet members connected to a respective teatcup of the milking machine via a short milk conduit. An outlet member, which via a milk conduit is connected to a milk collecting unit of the milking machine, extends from said chamber. Both the outlet member and the inlet members are fixedly provided on the upper portion of the housing and are thus not movable in relation to each other. The outlet member comprises an outlet nipple extending radially outwardly perpendicularly from the center axis of the housing. The inlet members comprise four inlet openings provided in pairs so that one of the pairs is intended to be connected to teatcups being applied to the front teats of the cow and the other pair is intended for teatcups being applied to the rear teats of the cow. The inlet members are provided on a conical surface of the upper portion at the same height with respect to the vertical center axis.

By studying the position of the teats of the udder of cows, it has been recognized that the distance between the two front teats is longer than the distance between the two rear teats. An investigation from 1983 discloses an average distance between the front teats of 150 mm, between the rear teats of 85 mm and between the rear and front teats of 100 mm. Furthermore, it has been recognized that the front udder half is higher than the rear one, i.e. the two front teats are located at a higher position than the two rear teats. When the udders are charged with milk the teats are relatively stiff and straggling and will therefore be relatively immovable in relation to these positions. This situation makes it difficult to attach teatcups configured in a conventional manner to the teats of the cow, since the teatcups do not reach the teats properly and it may therefore be difficult to attach teatcups in such a manner that they close tightly against the teat. If the teatcup liner does not close tightly against the teat, there may be a significant air inlet between the teatcup liner and the teat, which may not be controlled. This deficiency makes the milking less effective and requires a higher capacity of the vacuum pump and it may in certain situations lead to detachment of the teatcups before the milking has been terminated. The milk conduits may also not be arbitrarily long, since the claw in such a case will touch the ground or the floor, at least during the end of the milking. The problems mentioned above have become worse in recent time, since the short milk conduit has become thicker and thus stiffer in order to be able to conduct an increasing milk flow. Furthermore, it has been difficult to provide a close connection between the short milk conduit and the housing of the claw due to the bending forces acting on the milk conduit. Because of this, air tends to penetrate the inner space of the housing between the short milk conduit and the inlet opening.

SE-B-449 154 discloses a milking machine having a claw comprising a housing with an upper portion and a lower portion. Four inlet nipples are provided on the upper portion and connect the inner space of the housing to a respective teatcup of the milking machine via conduits. Four outlet nipples are provided on the lower portion and connect the inner space of the housing to a milking collecting member of the milking machine via conduits. In the inner space of the housing there are four intermediate walls dividing the inner space of the housing in four chambers of equal size. One inlet nipple and one outlet nipple is in connection with each chamber. The upper portion may be rotated in fixed 90°0 steps in relation to the lower portion so that each inlet nipple may be displaced to be opposite another outlet nipple.

U.S. Pat. No. 2,775,225 and U.S. Pat. No. 2,429,983 both disclose a claw provided with four inlet nipples provided in pairs and adapted to the position of the teats of the udder. These documents do not teach how to configure a passage through the wall of the claw in order to be able to receive a teatcup liner.

FR-A-1 158 460 discloses a quite different type of claw having four inlet nipples, all directed in essentially the same direction. Each nipple is mounted in a passage extending through an essentially plane wall portion of the claw. The teatcup liners are adapted to be mounted on the nipples in a conventional manner.

SUMMARY OF THE INVENTION

The object of the present invention is to overcome the problems mentioned above and provide a claw having such a configuration that it may be attached in a secure and tight manner to the teats of an animal to be milked.

This object is obtained by the claw initially defined and characterized in that each inlet member comprises a passage extending through the wall of the housing and arranged to receive one of said teatcup liners therethrough, that each passage is surrounded by and extends through a portion of the wall of the housing, and that this portion has essentially plane parallel surfaces. By such a claw configuration adapted to the animal it is ensured that the teatcups in a better way than previously reach their respective teats and thus that the engagement or the grip between the teatcup liners and their respective teats is improved. Furthermore, the tensions in the milk conduits decrease and the claw will be suspended in more natural manner beneath the animal. Furthermore, such a configuration results in an equal, downwardly directed force, acting at each teat, for all four teats and thereby an equal and proper milk extraction of each teat is guaranteed. Since the portion through which the passage extends has essentially plane parallel surfaces the mounting of the milk conduits in the housing of the claw is facilitated and one may prevent air from penetrating the housing, thereby generating disturbing noise. Furthermore, it is thereby possible to keep the required capacity of the vacuum pump on a lower level than otherwise would have been the case.

According to an embodiment of the invention, the inlet members are provided in pairs in such a manner that the first pair is located at a higher position with respect to the center axis than the second pair. In normal cases the front teats of a cow are located at a higher position than the rear teats. By this embodiment it is possible to compensate for this fact in such a manner that the downwardly directed force at each teat is equal and that center axis of the claw will extend vertically during the milking. This vertical operating position of the claw is advantageous since the milk collected in the inner space of the claw may be transported away therefrom in an uniform and continuous flow.

According to a further embodiment of the invention, the inlet members are provided in pairs in such a manner that the distance between the inlet members of the first pair is greater than the corresponding distance of the second pair. In this way, one takes into account the fact that the front teats of the cow in the normal cases have a greater mutual distance than the rear teats of the cow.

According to a further embodiment of the invention, each passage extends in a direction which essentially forms a normal to the associated portion. Furthermore, the inlet members may be provided in pairs in such a manner that the passages of the first pair extend obliquely forwardly and outwardly by a first angle in relation to a horizontal plane to which the center axis forms the normal and the passages of the second pair extend obliquely rearwardly and outwardly by a second angle in relation to the horizontal plane. Furthermore, each inlet member may extend in a direction directed essentially straight towards the teat associated with the inlet member when the claw in an operating position is attached to the udder of the animal. Also in this way, it is possible to compensate for the fact that the front teats of the cow are located at a higher position than the rear teats. Furthermore, it is possible to compensate for the fact that the front teats of the cow in normal cases have a longer mutual distance than the rear teats of the cow.

According to a further embodiment of the invention, the housing comprises a first portion and a second portion, the outlet member is provided on the first portion, the inlet member is provided on the second portion and the first portion is rotatable in relation to the second portion. By such a configuration the outlet member may be displaced in relation to the inlet members so that it is directed towards the milk collecting member of the milking machine, i.e. the conduit member provided between the outlet member and the milking machine will not apply any torsional force to the claw but the latter may maintain an optimal operating position in relation to the teats of the animal. Furthermore, such a configuration is advantageous since the claw according to the invention has a pronounced front and rear end. Thereby, the conduit member may be adjusted in such a manner that it is directed essentially forwardly if the milking machine is located in front of the animal to be milked, laterally if the milking machine is located laterally of the animal to be milked, or rearwardly if the milking machine is located behind the animal to be milked.

BRIEF DESCRIPTION OF THE DRAWINGS

The present invention will now be explained more closely by means of different embodiments, shown by way of example, and with reference to the drawings attached.

FIG. 8 discloses a side-view of an animal during milking by a claw according to the invention.

FIG. 9 discloses a view from behind of an animal during milking by a claw according to the invention.

DETAILED DESCRIPTION OF DIFFERENT EMBODIMENTS

Figure 1:
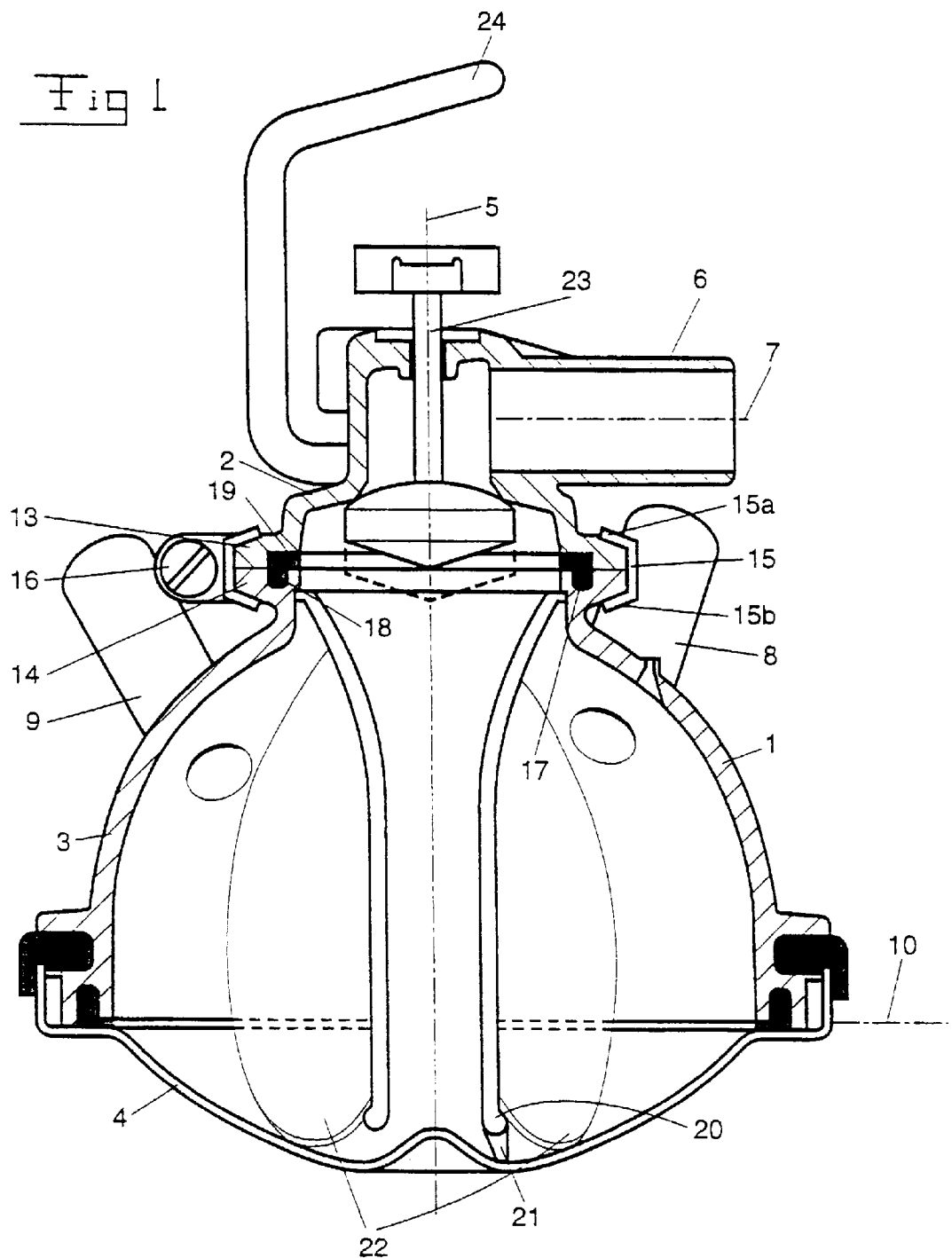
FIG. 1 discloses a vertical section through a claw according to a first embodiment of the invention.

With reference to FIG. 1 to 7, a claw according to the invention is disclosed, which comprises a housing 1. The housing 1 comprises a first upper portion 2, a second intermediate portion 3 and a third lower portion 4. Through the housing 1, a center axis 5 extends essentially vertically when the claw is in an optimal operating position. On the upper portion 2 an outlet member is provided, which in the example disclosed comprises an outlet nipple 6 extending essentially radially outwardly from the housing 1 and the upper portion 2 with respect to the center axis 5, i.e. the outlet nipple 6 has a longitudinal center axis 7 being perpendicular to the center axis 5. On the intermediate portion 3 four inlet members, shown as inlet nipples 8, 9 inlet passages and 8', 9', respectively, are provided.

Components which in the different embodiments have corresponding functions have been given the same reference signs.

Figure 2:
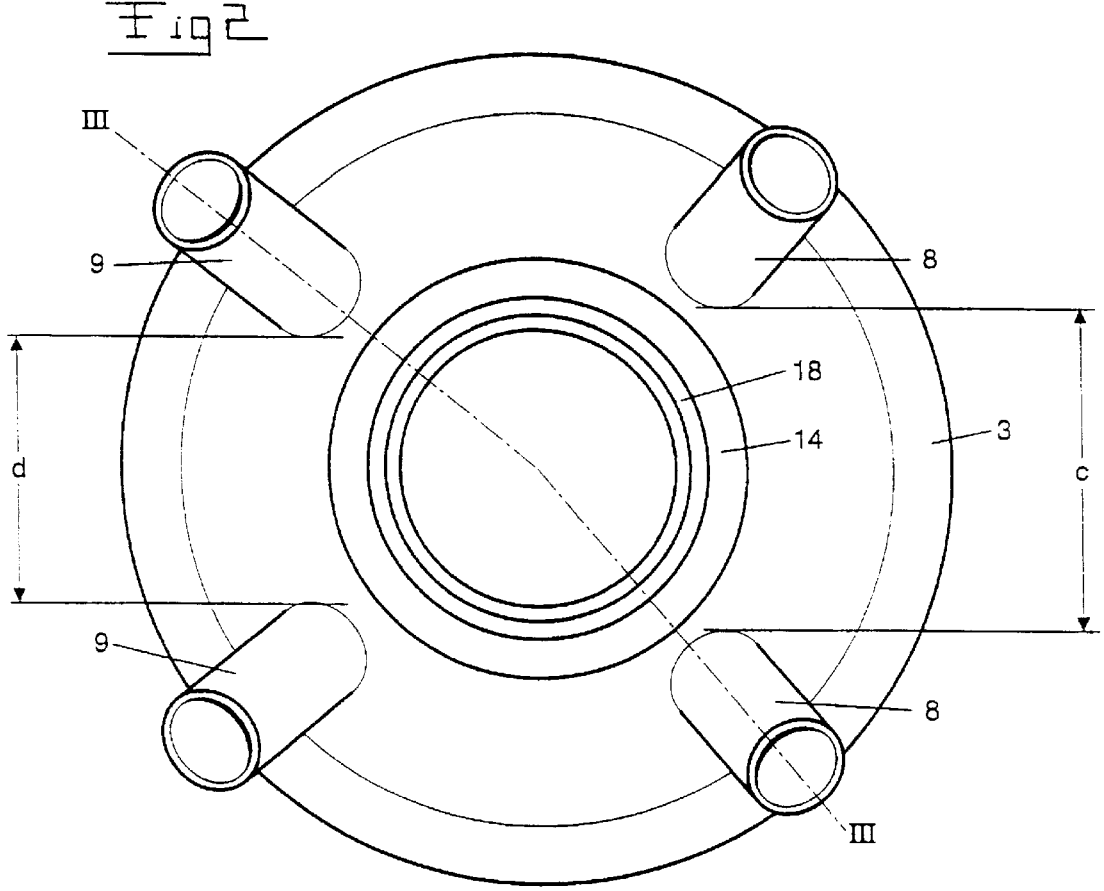
FIG. 2 discloses a view from above of a portion of the claw according to FIG. 1.
Figure 3:
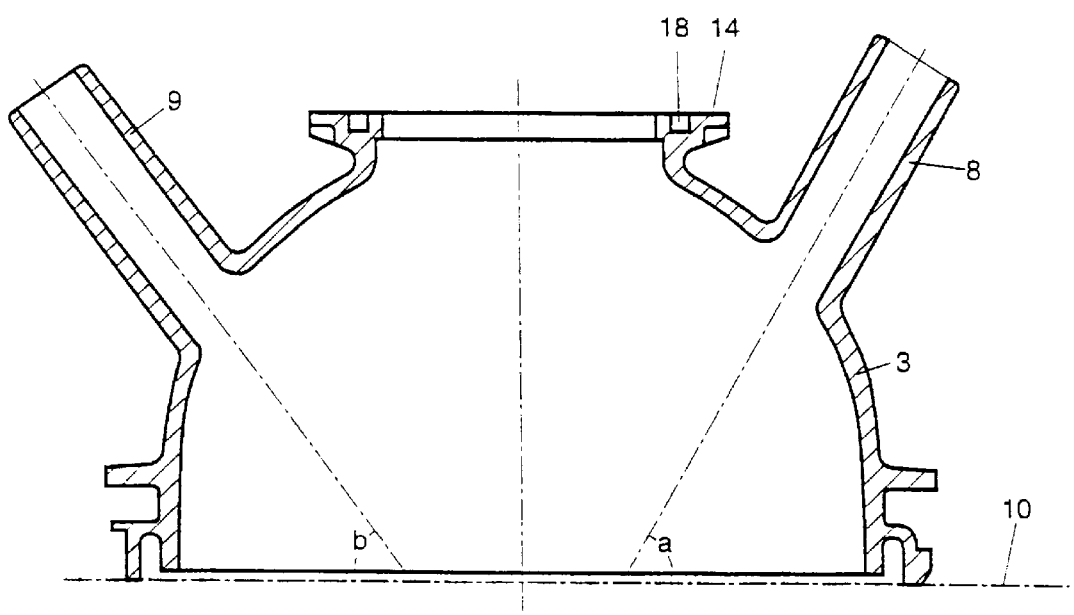
FIG. 3 discloses a section along the line III—III in FIG. 2.

According to the embodiments disclosed in FIG. 1–3 the inlet members comprise four tubular elements extending obliquely upwardly and configured as inlet nipples 8, 9. Each inlet nipple 8, 9 is intended to be connected to a short milk conduit (not disclosed) which in turn is connected to a teatcup (not disclosed). The inlet nipples 8 are intended for the teatcups to be connected to two front teats of a cow to be milked and the inlet nipples 9 are intended for the teatcups to be connected to the rear teats of the cow. As is disclosed in FIG. 3, the front inlet nipples 8 extend to a higher position with respect to a horizontal plane 10 to which the center axis 5 forms the normal than the rear inlet nipples 9. Since the inlet nipples 8 and 9 have an equal length, this configuration has been accomplished by providing the front inlet nipples 8 at a higher location than the rear inlet nipples 9 on the intermediate portion 3. The front inlet nipples 8 extend in a longitudinal direction obliquely forwardly and outwardly by an angle a of inclination in relation to the horizontal plane 10 and the rear outlet nipples 9 extend in a longitudinal direction obliquely rearwardly and outwardly by a angle b of inclination in relation to the horizontal plane 10. It should be noted that the angles a and b define the inclination of the longitudinal directions of the inlet nipples 8, 9 in the two planes being radial with respect to the centre axis 5 and coinciding with the section III—III in FIG. 2. As is disclosed in FIG. 3, the angle a is greater than the angle b. Furthermore, as is disclosed in FIG. 2, the mutual distance c between the front inlet nipples 8 is greater than the mutual distance d between the rear inlet nipples 9.

Figure 5:
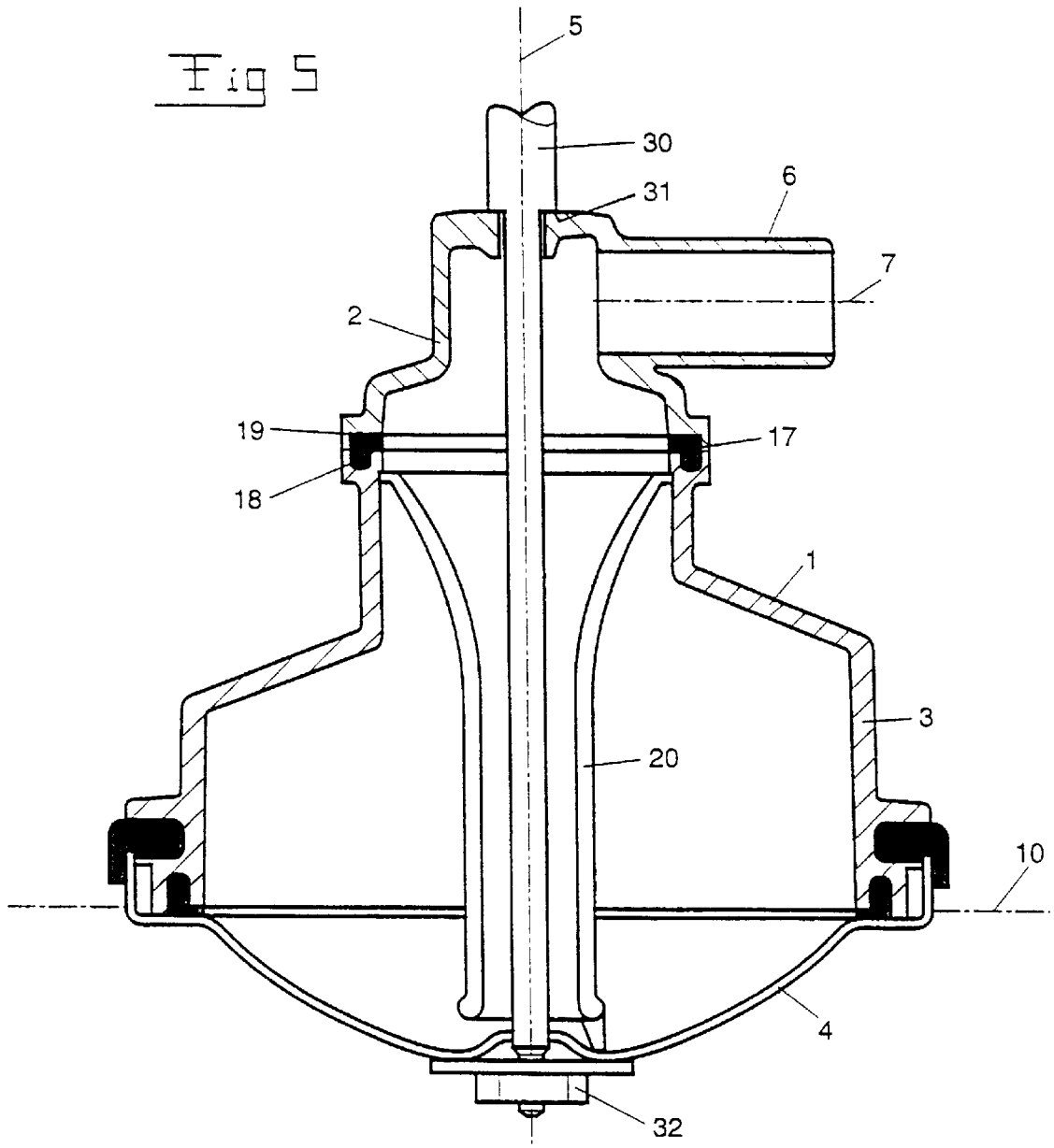
FIG. 5 discloses a vertical section through a claw according to a second embodiment of the invention.
Figure 6:
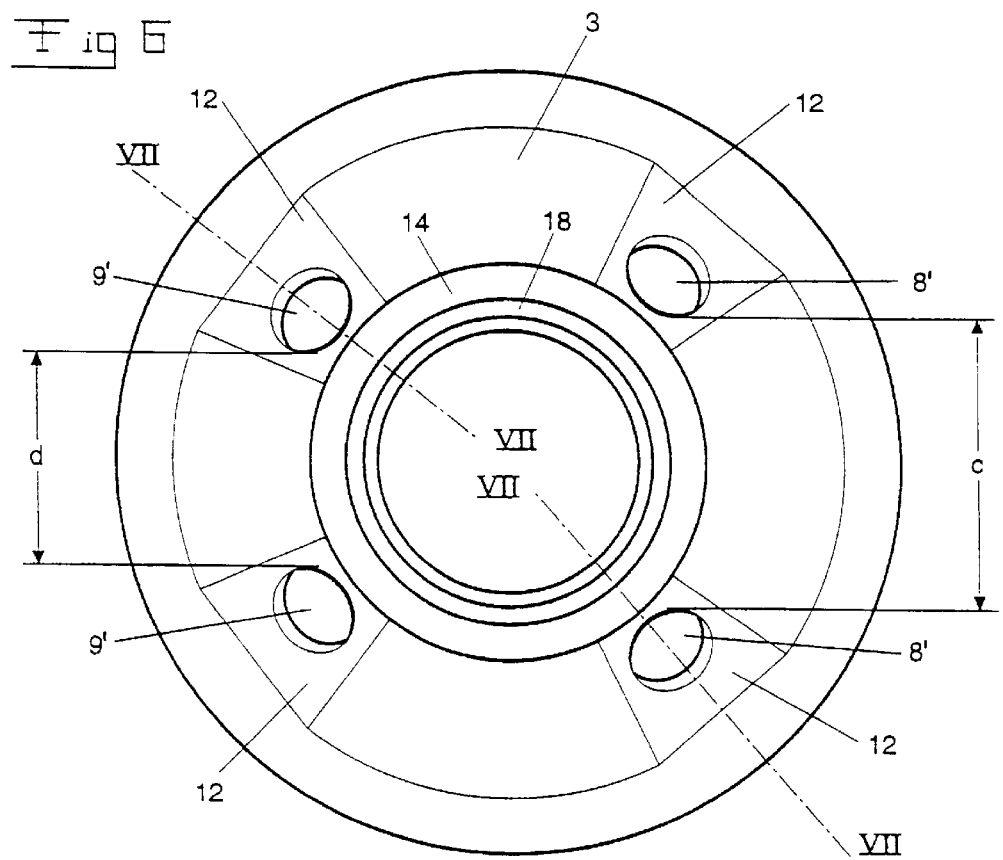
FIG. 6 discloses a view from above of a portion of the claw according to the second embodiment.
Figure 7:
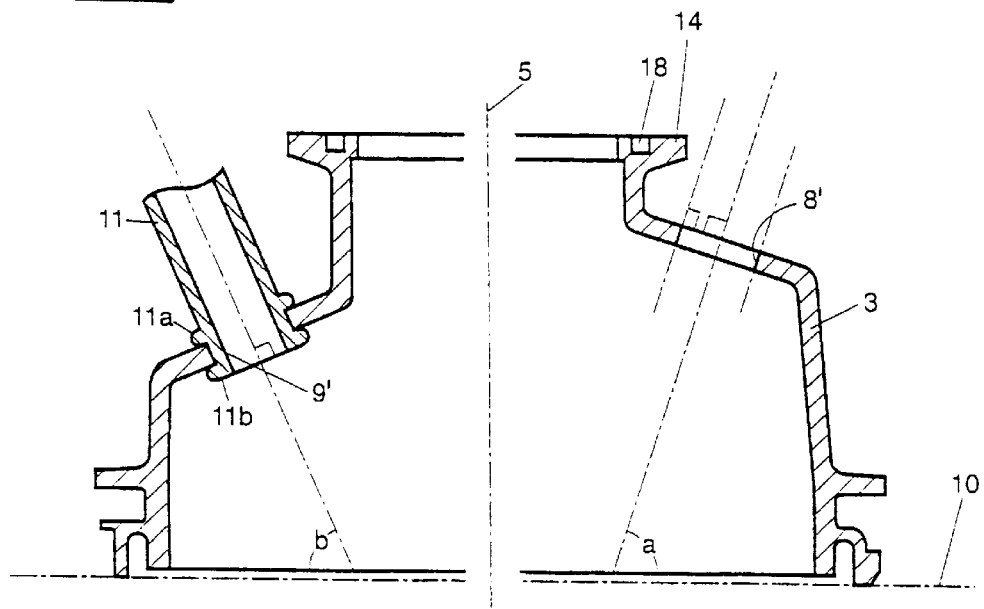
FIG. 7 discloses a section along the line VII—VII in FIG. 6.

According to the embodiment disclosed in FIG. 5–7, each inlet member comprises an inlet passage 8', 9' which extends through the wall of the housing 1 and is adapted to receive a short milk conduit 11 fixed to the wall of the housing 1 by means of two ribs 11a, 11b, provided on the outer surface of the milk conduit 11 and extending therearound, see FIG. 7. Each such short milk conduit 11, which practically frequently are a prolongation of a teatcup liner, is a standard product which preferably is manufactured in one single length. In such a manner, the manufacturing of the short milk conduits/teatcup liners is facilitated and exchange thereof is simplified since it is not necessary to take into account the positioning of an individual teatcup liner with respect to a particular inlet passage. The housing 1 disclosed in FIG. 5–7 forms a wall by means of which the inner space of the housing 1 is delimited. This wall has a wall portion 12 around each inlet passage 8', 9', i.e. the inlet passage 8', 9' extends through said portion. This wall portion 12 is essentially plane parallel, i.e. the outer surface of the portion 12 is essentially parallel with the inner surface of the portion 12, and these surfaces are essentially plane. This means that the ribs 11 a and 11b may sealingly close the passage, so that no air may penetrate the inner space of the housing 1 between the edge side of the inlet passage 8', 9' and the milk conduit 11 introduced in the inlet passage 8', 9'. It should also be noted that each inlet passage 8', 9' extends in a direction essentially perpendicular through the wall portion 12, see FIG. 7, i.e. the edge side of the passage 8', 9' is essentially perpendicular to the outer surface and the inner surface of the wall portion 12. Thereby, the sealing capacity of the milk conduit 11 against the housing around the passage 8', 9' is further improved. In the areas between the wall portions 12, the housing 1 may have an arbitrary shape. In a similar way as in the embodiment according to FIG. 1–3, the four inlet passages 8', 9' are provided in pairs in such a manner that the first pair inlet passages 8', intended for two front teats of a cow to be milked, is located at a higher position with respect to the vertical center axis 5 than a second pair of inlet passages 9', intended for the rear teats of the cow, see FIG. 7. Furthermore, the four inlet passages 8', 9' are arranged in such a manner that each inlet passage extends in said direction through the wall of the housing 1 essentially straight towards the teat to which the inlet passage 8', 9' is intended to be connected. Furthermore, said direction of each passage 8', 9' coincides with the normal to the portion of the wall of the housing 1, through which the inlet passage 8', 9' extends, i.e. the plane parallel wall portion 12. This means that the wall portions 12 comprising the essentially plane parallel surfaces are not parallel to but are inclined in relation to the horizontal plane 10 and that the normals of the wall portions 12, i.e. said directions, of the first pair 8' of the passages, which are intended for the two front teats of the cow to be milked, extend obliquely forwardly and outwardly by a first angle a in relation to the horizontal plane 10 and that the normals, i.e. said directions, of the second pair of inlet passages 9', which is intended for the rear teats of the cow, extend obliquely rearwardly and outwardly by a second angle b in relation to the horizontal plane 10. It should be noted that the angles a and b define the inclination of the directions of the inlet passage 8', 9' in the two planes which coincide with the sections VII—VII in FIG. 6. The angles a and b in FIG. 7 are defined by the height difference between the front and the rear teats of the cow, i.e. the fact that the rear teats normally are located at a lower position, by the distance between the front and the rear teats and by the mutual distance between the front teats and the mutual distance between the rear teats. Moreover, as is disclosed in FIG. 6, the mutual distance c between the front inlet passages 8' is longer than the corresponding distance d between the rear inlet passages 9'.

The upper portion 2 comprises a radially projecting flange 13 and the intermediate portion 3 comprises a corresponding radially projecting flange 14. The upper portion 2 and the intermediate portion 3 are kept together by means of a locking member, which in the example disclosed in FIG. 1–3 is formed by a profiled clamp 15.

The profiled clamp 15 comprises two opposing obliquely upwardly and obliquely downwardly, respectively, directed flanges 15a and 15b which abut corresponding oblique surfaces of the radially projecting flanges 13 and 14, respectively. When the profiled clamp 15 is compressed by means of a screw member 16 disclosed in the example, the flanges 13 and 14 will be pressed against each other. In order to seal the inner space of the housing 1, a sealing ring 17 may be provided between the radially projecting flanges 13 and 14. In the example disclosed the radially projecting flange 14 comprises a recess 18 extending therearound, in which the sealing ring 17 is provided, and the radially projecting flange 13 comprises a recess 19 having a diameter corresponding to the outer diameter of the sealing ring 17.

Furthermore, in the inner space of the housing 1 a suction pipe 20 is provided. This extends in the direction of the center axis 5 and is by means of support members 21 provided at a distance from a bottom of the housing 1. In the upper end the suction pipe 20 abuts the inner wall of the intermediate portion 3 and in this way the suction pipe 20 is fixedly provided in the inner space of the housing 1. Furthermore, the suction pipe 20 may, as is disclosed in FIG. 1, comprise four wings 22 which extend in a respective radial plane and are provided by a mutual angle distance of about 90° and in such a manner that a wing 22 extends radially outwardly between each of the inlet members.

As is disclosed in FIG. 1 the claw may comprise a closing valve 23 provided in the upper portion 2 and displaceable along the center axis 5. The closing valve 23 is intended to close off automatically the outlet member as the claw is attached to an animal. Furthermore, the claw may comprise a suspension member 24, see FIG. 1.

Figure 4:
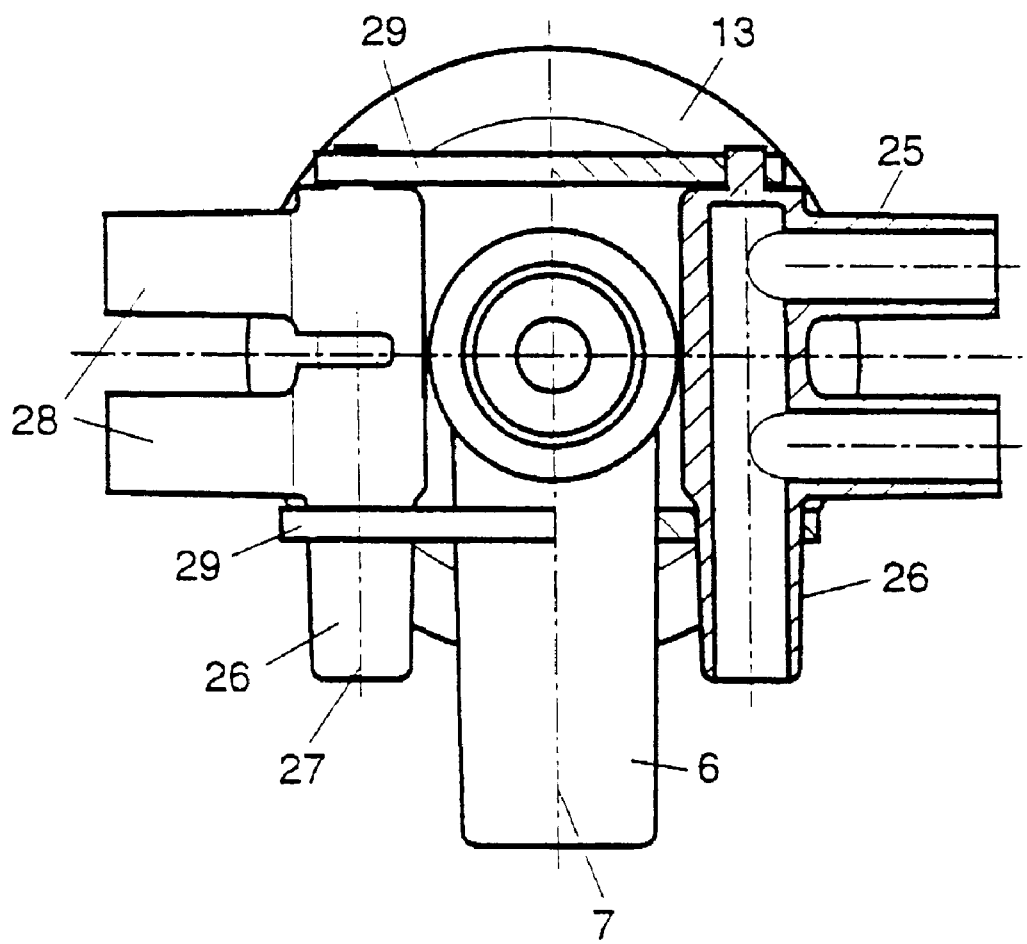
FIG. 4 discloses a partly sectional view from above of another portion of the claw according to FIG. 1.

As is disclosed in FIG. 4, the claw comprises two distributing members 25 provided on the upper portion 2. Each distributing member 25 comprises an inlet pipe 26 having a respective longitudinal axis 27. The axes 27 are provided in parallel to the longitudinal axis 7 of the outlet nipple 6. Furthermore, each distributing member 25 comprises two inlet pipes 28 which, via a respective short pulse conduit (not disclosed), are connected to a pulsating chamber of a teatcup (not disclosed). Each distributing member 25 is attached to two support members 29 provided on the upper portion 2 in such a manner that the distributing members 25 are rotatable about their respective longitudinal axis 27.

The claw disclosed in FIG. 5 comprises no profiled clamp but is kept together by means of a bolt 30 extending along the centre axis 5 through the whole claw. The bolt 30 comprises a step 31 abutting the upper portion 2 and in its lower end a thread on which a nut 32 is screwed. By tightening the nut 32, the three portions 2,3 and 4 are compressed against each other and the upper portion 2 may be locked in an arbitrary rotational position in relation to the intermediate portion 3. The bolt 30 may in its upper end be provided with a suspension member not disclosed.

It should also be noted that the claw does not need to have a circular shape seen from above, but may for example be a quadrangle tapering in a rearward direction, i.e. the front edge side is longer than the rear edge side. Such a shape is adapted to the positions in which the inlet members are located.

By a claw, which is adapted to the position of the teats of the animal to be milked, i.e. which has a pronounced front and rear end, it may be advantageous with four essentially fixed rotational positions for the upper portion 2, comprising the outlet nipple 6, in relation to the intermediate portion 3. These essentially fixed or marked rotational positions are located at a distance of about 90° from each other and correspond to the case that the milking machine is located essentially in front of, laterally of or behind the animal to be milked.

During use the claw 1 disclosed functions in the following way, see FIG. 1–9. Milk from the teatcups not disclosed is sucked via the inlet members (inlet passages 8, 9 and inlet passages 8', 9', respectively) into the inner space of the housing 1. From there, the milk is sucked further via the suction pipe 20 out through the outlet nipple 6 which via a milk conduit 33 may be connected to a collecting container of a milking machine 34. The milking conduit 33 extends in parallel to two pulse conduits (not disclosed) connecting the inlet pipe 26 of the distributing members 25 to a vacuum pump of the milking machine (not disclosed). The milk conduit 33 and the pulse conduits may be connected to a conduit package. This conduit package is necessarily relatively rigid and heavy and will therefore apply significant torsional forces to the claw. By the claw disclosed, these torsional forces may be minimized by a rotation of the upper portion 2 about the center axis 5 in relation to the intermediate portion 3. Preferably, the upper portion 2 is rotated so much that the outlet nipple 6 will be directed essentially in the direction in which the milk conduit 33 and the pulse conduits extend. This direction is defined by the disposition in a milking stall in which the claw is used. When this best direction has been chosen the upper portion 2 is locked in relation to the intermediate portion 3 by tightening the nut 32 or the screw member 16 thereby compressing the radially projecting flanges 13 and 14 of the profiled clamp 13 against each other.

As is disclosed in FIG. 8 and 9 the claw will, due to the configuration according to the invention, be suspended horizontally, i.e. the center axis 5 will be vertical. Because of this, the pulling force acting downwardly at each teat will be essentially equal and thereby a uniform and equal milk extraction from each teat is ensured. Furthermore, the horizontal position means that the milk collected in the claw may be transported away therefrom in an uniform and continuous flow, thereby reducing the risk for so called impact and backflow.

The invention is not limited to the embodiments disclosed but may be varied within the scope of the features defined in the following claims. For instance, the outlet nipple 6 and the upper portion 2 may also be rotated in a vertical direction in relation to the intermediate portion 3 in order to compensate for a possible height difference between the claw and the milking machine or due to the downwardly rotating force applied to the claw by the milk conduit due to its weight.

We claim:

1. A claw for a milking machine comprising:
a housing having four inlet members, which are adapted to connect the housing to four respective teats of an animal to be milked via four teatcup liners, and an outlet member, which is adapted to connect the housing to a milk collecting member of the milking machine via a conduit member, said housing having a center axis extending through the claw essentially vertically when the claw, in an operating position, is attached to the udder of the animal, said four inlet members being distributed around the center axis and provided in pairs in such a manner that they are adapted to the natural position of the teats of the udder of the animal, a first pair of the inlet members, which is intended for two front teats of the animal, being directed obliquely forwardly and outwardly and having a different position with respect to the center axis than a second pair of the inlet members, which is intended for the rear teats of the animal and is directed obliquely rearwardly and outwardly with respect to the center axis, wherein each inlet member comprises a passage extending through the wall of the housing, said passage being arranged to receive one of said teatcup liners therethrough, wherein each passage is surrounded by and extends through a respective portion of the wall of the housing, wherein each passage extends in a direction which essentially forms a normal to said respective wall portion, and wherein this portion has essentially plane parallel surfaces on inner and outer surfaces thereof.

2. A claw according to claim 1, wherein the inlet members are provided in pairs in such a manner that the first pair is located at a higher position with respect to the center axis a point on than the second pair.

3. A claw according to claim 1, wherein the inlet members are provided in pairs in such a manner that the distance between the inlet members of the first pair is longer than the corresponding distance of the second pair.

4. A claw according to claim 1, wherein the inlet members are provided in pairs in such a manner that the passages of the first pair extend obliquely forwardly and outwardly by a first angle in relation to a horizontal plane to which the center axis forms the normal, and that the passages of the second pair extend obliquely rearwardly and outwardly by a second angle in relation to the horizontal plane.

5. A claw according to claim 1, wherein each inlet member extends in a direction directed essentially straight towards the teat associated with the inlet member when the claw, in an operating position, is attached to the udder of the animal.

6. A claw according to claim 1, wherein the housing comprises a first portion and a second portion wherein the outlet member is provided on the first portion, wherein the inlet members are provided on the second portion, and wherein the first portion is rotatable in relation to the second portion.

7. A claw according to claim 6, wherein the first portion is continuously rotatable in relation to the second portion to such an extent that essentially no torsional force will be applied to the claw via the conduit member in said operating position.

8. A claw according to claim 6, wherein the second portion is located beneath the first portion in said operating position.

9. A claw according to claim 6, including a locking member by means of which the first portion is lockable in said position in relation to the second portion.

* * * * *